March 1, 1960 J. L. LINDAUER, JR 2,926,712
FOOD CUTTER
Filed July 17, 1957 3 Sheets-Sheet 1
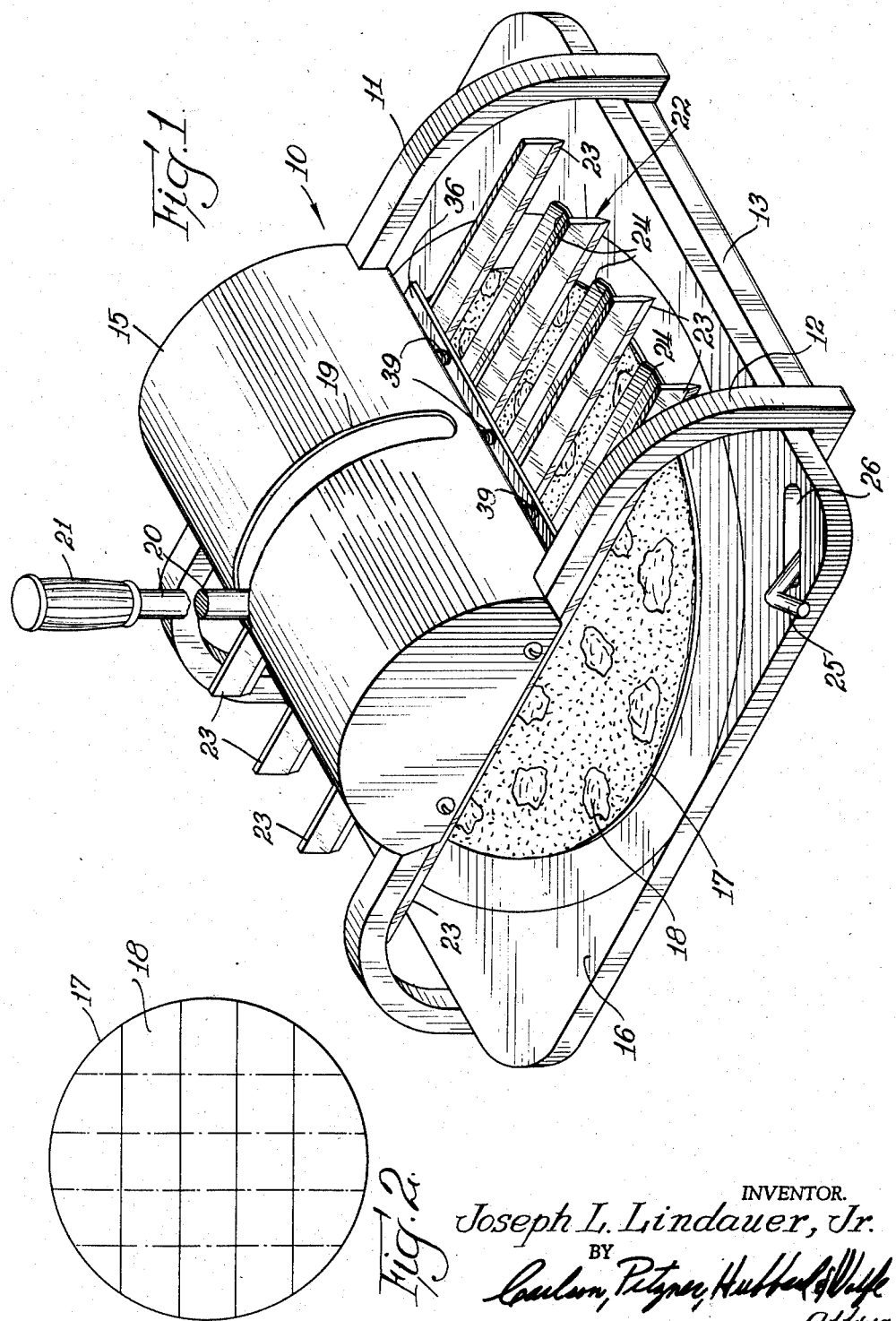
INVENTOR.
Joseph L. Lindauer, Jr.
BY
Attys.

March 1, 1960  J. L. LINDAUER, JR  2,926,712
FOOD CUTTER
Filed July 17, 1957  3 Sheets-Sheet 2

INVENTOR.
Joseph L. Lindauer, Jr.
BY
Att'ys.

March 1, 1960     J. L. LINDAUER, JR     2,926,712
FOOD CUTTER
Filed July 17, 1957     3 Sheets-Sheet 3
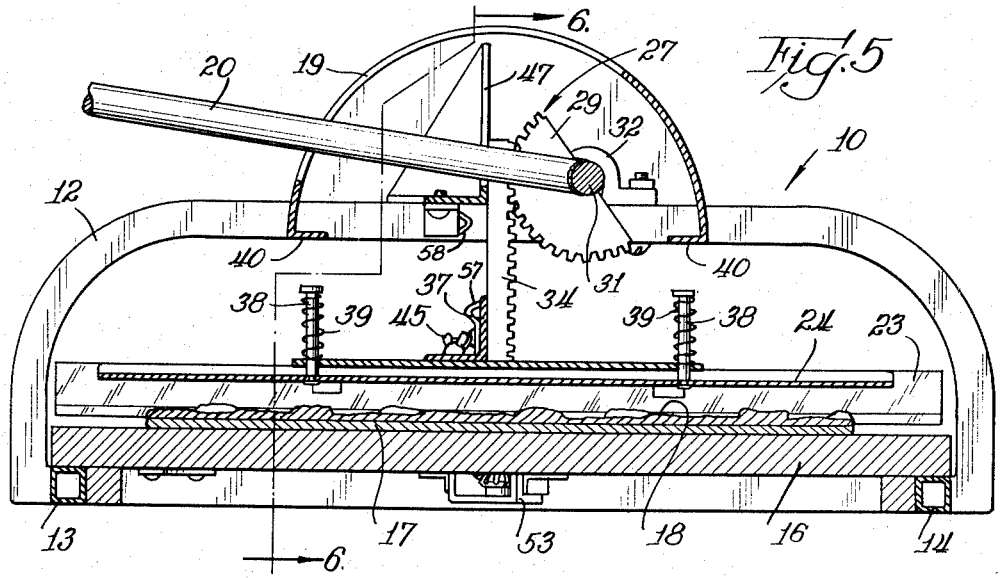
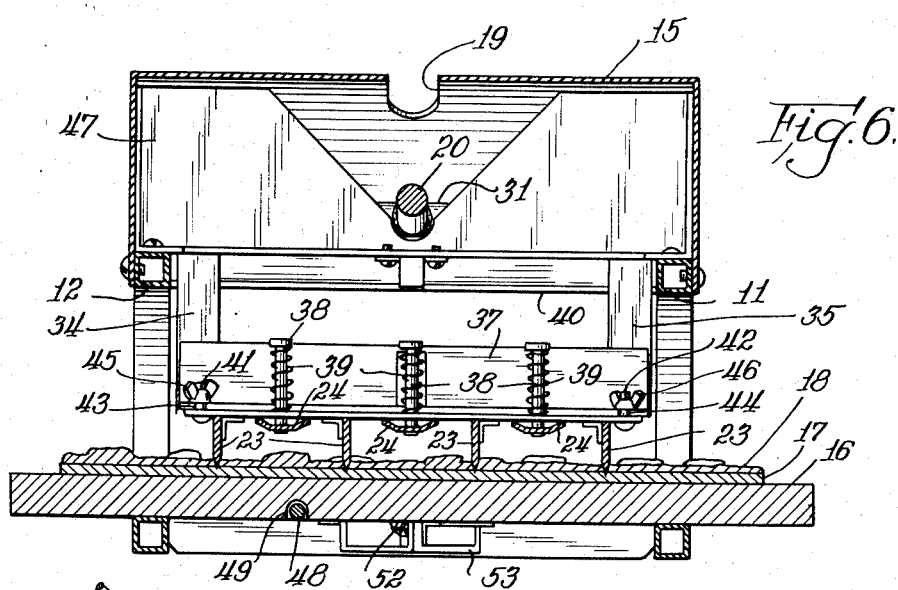
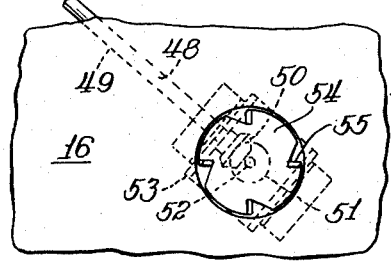
INVENTOR.
Joseph L. Lindauer, Jr.

United States Patent Office 2,926,712
Patented Mar. 1, 1960

2,926,712

FOOD CUTTER

Joseph L. Lindauer, Jr., Chicago, Ill.

Application July 17, 1957, Serial No. 672,461

4 Claims. (Cl. 146—160)

This invention relates to a device for rapidly cutting hot, tacky, hard-surfaced food products, such as pizza pies, into a plurality of substantially uniform portions.

As is well known to those who have eaten, and particularly to those concerned with the cooking and selling of pizza pies, the customer requires that the product be divided into easily handled portions prior to distribution. Such products are sold to be eaten while hot, and a hot pizza pie (usually predominating in cheese) is a difficult item to cut cleanly and quickly without affecting the overall geometry and appearance of the product. It is the general practice for restaurants selling pizza pies to purvey them to the customer while hot, disposed on a cardboard or metal tray, and cut into a number of easily handled, substantially uniform pieces. At the present time, pizza cutting is almost always done with a large hand-wielded carving knife and with varying degrees of effectiveness.

The cutting of pizza pies involves somewhat more effort and skill than would ordinarily be involved in the cutting of food products of similar shape and size. The principal difference resides in the combination of the rather gummy, adherent texture of the hot pie with the inherent resistance to cutting of the crust.

It is a primary object of the present invention to simplify, and at the same time speed up the cutting of pizza pies and the like, which are dispensed to the public while hot, in a plurality of substantially equally sized pieces. A further object is to eliminate the possibility of cutting the fingers and hands of persons involved in purveying pizza pies to the public. Still another object is to assure freedom from destruction of the eye-appealing appearance of the whole pie while permitting ease of cutting into properly sized portions. These and additional objects and advantages will be apparent from the ensuing description of my invention.

My device for cutting pizza pies and the like into a plurality of substantially equally sized portions comprises a vertically movable cutter assembly and a cutting board, disposed beneath said cutter assembly on which the pizza is placed. The cutting cord has means embodied therein whereby the pizza pie may be rotated to permit the same to be divided into a large number of portions without the necessity of having more than about four blades in the cutter assembly.

In addition, the device of the present invention embodies certain features in combination with the vertically movable cutter assembly and cutting board which assures that the sticky pizza pieces are readily ejected from the cutter blades upon completion of each cutting operation.

In cutting tacky or sticky foods having a texture such as the hot pizza pie presents, it is essential that the food be cut cleanly and that it not hang up on the cutter blades upon the completion of the cutting operation. To assure this optimum result there are disposed intermediate the blades of the cutter assembly ejectors which are automatically actuated during the cutting operation to assure separation of cut food from the cutter assembly.

The cutter blades embodied in my novel apparatus preferably consist of four stainless steel knives or blades disposed in spaced, parallel relationship and of a length substantially equal to that of the cutting board.

When the cutter assembly is actuated by a lever affixed thereto, the pizza pie or other food placed therebelow is cut (when four blades comprise the cutter assembly) into five sections, each of which is substantially larger than is desirable for one portion. Accordingly, provision is made in my apparatus for rotating the food on the surface of the cutting board, after a first vertical cut, through 90°.

This is accomplished by provision of a rotatable disc disposed in the center of the cutting board and having sharp prongs extending vertically therefrom. These prongs are forced into the cardboard tray or aluminum tray on which the food is placed when the cutter assembly is forced down upon the food in the first cutting operation. Thereafter, upon raising the cutter assembly, the foot is rotated through a 90° angle and the cuttinp operation is repeated, resulting in (in the case of a cutter having four blades) into twenty-five substantially equal portions suitable for serving.

The mechanisms resulting in the automatic ejection of food from between the blades, rotation of the food beneath the cutter blades following the first cutting operation and the vertical movement of the cutter assembly itself will be described in greater detail in connection with the detailed description of this invention which follows.

In the accompanying drawings, to which the following detailed description will refer:

Fig. 1 is a perspective view of the cutting apparatus showing the general arrangement of the principal parts.

Fig. 2 is a diagrammatic representation of the cut pizza pie following two cutting operations and an intermediate 90° rotation of the pie.

Fig. 5 is a sectional side elevational view of the device showing the position of the cutter assembly at the terminus of a cutting operation.

Fig. 6 is a side elevational view in partial section taken along lines 6—6 in Fig. 5.

Fig. 7 is a view of the rotatable disc in the center of the cutting board showing a provision for prongs thereon fashioned from the disc itself.

Figures 3, 4:
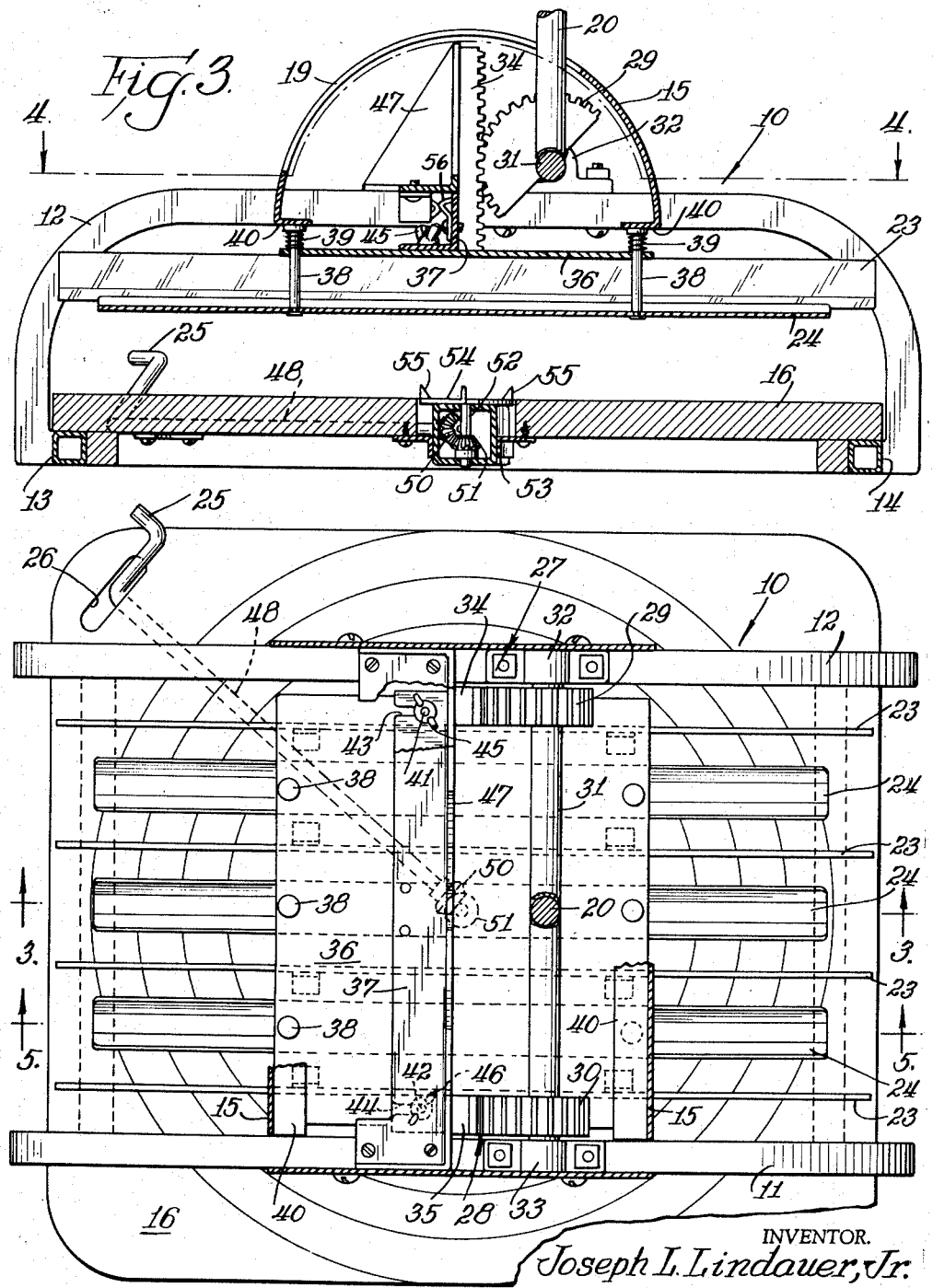
Fig. 3 is a side elevational view in partial section of the device showing the internal mechanisms for actuating the cutter assembly and rotation of the food.
Fig. 4 is a plan view taken along lines 4—4 in Fig. 3, showing in detail the cutter assembly and actuating mechanisms therefor.

Referring now to the drawings, frame 10 is composed of two vertical structural members 11 and 12, which are permanently connected at their base by members 13 and 14 and along their upper portions by means of removable housing 15. In Fig. 1 may be seen most clearly the table or cutting board 16 which has disposed thereon a cardboard tray 17 with a pizza 18 shown in position to be cut.

The housing 15 has an arcuate slot 19 to permit travel of the lever 20 which is movable through an angle of about 90° by grasping the handle 21 and pulling down. Such downward movement of handle 21 actuates the cutter 22 which consists, in the design shown in the attached drawings, of four spaced, parallel knives or blades 23 extending substantially the length of the cutting board 16. The manner in which these knives 23 and their intermediate food ejectors 24 are mechanically combined to form the cutter 22 will be hereinafter described in detail. Suffice it to say at this juncture that upon grasping of handle 21 and actuation of lever 20 the cutter is caused to move vertically downward, resulting in the knives being forced through the food 18 placed thereunder.

In Fig. 1 the apparatus is shown in the receiving position, i.e., just after the food 18 on tray 17 has been placed on cutting board 16 and prior to any cutting operation. The position of the lever 20 shown in Fig. 1 is also that to which it is returned after making a cut as described above.

Thus, after once bringing the cutter blades down upon the food to cut the same into five pieces, handle 21 is returned to the position shown in Fig. 1. Lever 25 is then moved from one end of slot 26 to the other. This movement of lever 25 results (through mechanism hereinafter described in detail) in tray 17 being rotated through an angle of 90°. When the tray with the food has been thus rotated, the cutting operation is repeated and the resulting cut food is divided into twenty-five more or less equal portions as shown diagrammatically in Fig. 2.

In Fig. 3 and Fig. 4, particularly, are shown the internal mechanisms which are responsible for the vertical movement of the cutter 22 and the 90° rotation of the food upon actuation of lever 25.

Referring first to the rack and pinion mechanisms 27 and 28, which afford vertical movement of cutter 22, it may be seen that the two pinions 29 and 30 are affixed to rod 31 as their axes and that said pinions are rotated through their respective vertical planes as a result of movement of lever 20 which is affixed at its lower end to the center of rod 31. Rod 31 is positioned in trunnions 32 and 33 which are affixed to the tops of structural members 11 and 12, respectively.

Pinions 29 and 30 coact with racks 34 and 35, respectively, in the usual way to cause the racks, which are vertically disposed on cutter 22, to move up and down in parallel vertical paths of equal length.

The cutter assembly 22 comprises the four blades 23, three food ejectors 24, plate 36 to which the upper edge of blades 23 are affixed (e.g., by welding), L-section 37 which is detachably affixed to plate 36 and which extends slightly over each edge of plate 36, and racks 34 and 35 which are affixed to the vertical leg of L-section 37 at each end thereof. Thus, rotation of the pinions 29 and 30 enmeshed with racks 34 and 35, respectively, result in vertical movement of cutter assembly 22.

The six guide pins 38 are freely slidable through apertures formed in plate 36 and are affixed to ejectors 24 and serve to define the vertical travel of the ejectors. Pins 38 have springs 39 disposed about their shank. Such springs are confined between plate 36 and the heads on the upper ends of pins 38. Springs 39, acting against plate 36 and the heads of pins 38, keep ejectors 24 in their upper position (as shown in Fig. 5 and Fig. 6) when cutter assembly 22 is depressed during a cutting operation. Hence, it may be said that pins 38 and springs 39 constitute a lost-motion connection between the cutter assembly and the ejectors, the said springs normally urging said ejector means upwardly and permitting vertical movement of said cutter assembly independently of said ejector means as the cutter assembly and ejector means are moved toward the upper, normal position of the cutter assembly.

As lever 20 is returned to an upright position after completing a cut, the heads of pins 38 strike the underturned edge 40 of housing 15, terminating the upward movement of the ejector means. Upward movement of the cutter assembly is continued until the cutter assembly is returned to its normal, upper position, springs 39 being compressed during the continued upward movement of said cutter assembly. Upon completion of the return stroke of lever 20 to its upright position, and the return of the cutter assembly to its normal, upper position, the lower cutting edges of the blades are positioned in substantial horizontal alignment with, or slightly above, the ejectors 24, as clearly shown in Fig. 3. This assures disengagement from the blades of any cut portions of pizza which may have clung there during the upward movement of the cutter assembly.

As noted above, plate 36 of cutter assembly 22 is preferably removably attached to L-section 37. This may be accomplished in several ways and, for example, as shown most clearly in Fig. 4. Thus, plate 36 has screws 41 and 42 inserted therethrough with their threaded portions directed upward. These screws are inserted in slots 43 and 44 in the foot of L-section 37 and the cutter assembly is affixed thereto by wing-nuts 45 and 46.

Bracket 47 which is screwed down on the top of structural members 11 and 12 is best observed in Fig. 3, Fig. 4, Fig. 5 and Fig. 6. This bracket, in addition to affording structural strength to the apparatus, provides along its flat, vertical back-side two vertical ways for travel of racks 34 and 35. If desired, a flat spring steel (not shown) may be affixed to bracket 47 to act as spacer and wear plate between the racks and bracket.

In Figs. 3, 4 and 6 may be seen in detail extension 48 of lever 25 which lies horizontally in a channel 49 within or below cutting board 16. At the end of lever extension 48 is bevel gear 50 which coacts at right angles with bevel gear 51. Bevel gear 51 rotates on pin 52 in bracket 53, which is screwed to the base of cutting board 16. Pin 52, extending upward from bevel gear 51, is affixed to disc 54 having prongs 55 extending upward therefrom. These prongs may be affixed to the disc or be fashioned therefrom. As shown in Fig. 7, the prongs may be readily made by cutting the disc in four places and bending up the resulting narrow segments.

For safety sake it is desirable to provide a positive means on the cutter assembly to assure its retention in the upper position when not in use and particularly when the purveyor is centering the pie therebeneath. For this purpose the simple latch arrangement 56 shown closed in Fig. 3 has been found useful. In Fig. 5 prong 57 of this latch may be seen affixed to the cutter assembly and the receiving member 58 is fastened to the underside of bracket 47.

The positioning of the pizza or other food beneath the cutter assembly is, in itself, a very simple operation. But unless some guide is available to the operator he is apt to deviate from direct center, i.e., directly below the center of the cutter assembly, and therefore result in a cut pizza which is not uniformly portioned. This problem may be alleviated by the simple expedient of inscribing on the surface of the cutting board, and around the center point on the board, a series of concentric circles corresponding to the various sizes of trays used for the various pizza sizes. Such a series of circles is shown in outline beneath the cutter assembly in Fig. 4.

While food ejectors 24 have been described herein as being actuated by the depression of guide pins 38, it is to be understood that other means for actuating the same could be used.

I claim as my invention:

1. A food cutting apparatus comprising in combination a frame; a vertically moveable cutter assembly within said frame and including spaced, parallel blades and a support for said blades; means for vertically moving said cutter assembly within said frame from a normal, upper position to a lower cutting position, and for returning the same from said lower position to said upper position; ejector means disposed between a pair of said blades and vertically movable with said cutter assembly, said ejector means having a lost-motion connection with said cutter assembly including resilient means for normally urging said ejector means upwardly and for permitting vertical movement of said cutter assembly independently of said ejector means as said cutter assembly and ejector means are moved toward the upper position of said cutter assembly; and fixed, upward movement limiting means in the path of upward movement of said ejector means for contact by said ejector means upon upward movement thereof to terminate upward movement of said ejector means during upward movement of said cutter assembly prior to termination of the upward movement of said cutter assembly, thereby causing the blades of said cutter assembly to move upwardly relative to said ejector means and to cause any cut food adhering to said blades to thereafter contact said ejector means to effect removal thereof from said blades.

2. The food cutting apparatus of claim 1 wherein the ejector means comprises relatively flat and horizontally disposed strips and the same are affixed in said cutter assembly in a vertically slidable manner through openings in a portion of said cutter assembly lying above said strips by means of upright pins fixed at their lower ends to said strips and having enlarged heads on the ends of said pins extending above said portion of said cutter assembly, said enlarged heads being normally held away from the upperside of said portion of said cutter assembly by springs between the underside of said heads and said upperside of said portion of said cutter assembly.

3. The food cutting apparatus of claim 1 which includes means for retaining the cutter assembly in its upper position when not in use.

4. The food cutting apparatus of claim 1 wherein the cutter assembly is guided and actuated through its vertical path by a rack and pinion mechanism.

References Cited in the file of this patent

UNITED STATES PATENTS

| | | |
|---|---|---|
| 2,027,198 | Rappold | Jan. 7, 1936 |
| 2,062,170 | Forester | Nov. 24, 1936 |
| 2,322,243 | Larson et al. | June 22, 1943 |
| 2,604,132 | Peterson | July 22, 1952 |